United States Patent [19]

Ishikawa et al.

[11] Patent Number: 5,680,249
[45] Date of Patent: Oct. 21, 1997

[54] OPTICAL SYSTEM FOR CAMERA

[75] Inventors: Tuyoshi Ishikawa; Takashi Enomoto; Takayuki Ito, all of Tokyo, Japan

[73] Assignee: Asahi Kogaku Kogyo Kabushiki Kaisha, Tokyo, Japan

[21] Appl. No.: 517,063

[22] Filed: Aug. 21, 1995

[30] Foreign Application Priority Data

Aug. 23, 1994 [JP] Japan .................. 6-198755
Jun. 30, 1995 [JP] Japan .................. 7-166492

[51] Int. Cl.$^6$ .................. G02B 27/02; G02B 3/00; G02B 25/00
[52] U.S. Cl. .................. 359/434; 359/435; 359/653; 359/654; 359/643; 359/644; 354/190; 354/195.12
[58] Field of Search .................. 359/435, 434, 359/664, 653, 654, 680, 687, 685, 746, 750, 768, 643, 644; 354/190, 195.12

[56] References Cited

U.S. PATENT DOCUMENTS

| | | | |
|---|---|---|---|
| 4,370,032 | 1/1983 | Tateoka | 359/788 |
| 4,420,226 | 12/1983 | Kitagishi | 359/687 |
| 4,517,589 | 5/1985 | Baba et al. | 358/75 |
| 4,589,023 | 5/1986 | Suzuki et al. | 358/213 |
| 4,762,403 | 8/1988 | Hattori | 359/654 |
| 4,765,725 | 8/1988 | Suda | 359/719 |
| 5,179,478 | 1/1993 | Aoki | 360/35.1 |
| 5,418,647 | 5/1995 | Ishisaka | 359/692 |

FOREIGN PATENT DOCUMENTS

| | | | |
|---|---|---|---|
| 11754 | 1/1979 | Japan | 359/644 |
| 61-133928 | 6/1986 | Japan . | |
| 572741 | 9/1977 | U.S.S.R. | 359/644 |

*Primary Examiner*—Paul M. Dzierzynski
*Assistant Examiner*—Mohammad Y. Sikder
*Attorney, Agent, or Firm*—Greenblum & Bernstein, P.L.C.

[57] ABSTRACT

An optical system for a compound camera includes an equivalent image plane provided at a position substantially optically equivalent to an image plane of the photographing lens system. A condenser lens is provided proximate to the equivalent image plane and a relay lens system is provided behind the condenser lens to form an image of the photographing lens system on an image pickup device. The relay lens system satisfies the requirements defined by $-0.1<P<0.09$, and $S3<0$, where P designates the Petzval sum of the whole relay lens system when the focal length of the relay lens system is assumed to be 1.0, and S3 designates the astigmatism coefficient of the whole relay lens system when the focal length thereof is assumed to be 1.0, respectively.

10 Claims, 9 Drawing Sheets

OPTICAL SYSTEM FOR CAMERA

This application is related to U.S. Ser. No. 08/515,137 (Kannno) filed Aug. 15, 1995.

BACKGROUND OF THE INVENTION

1. Field of the Invention

The present invention relates to an optical system for a compound camera having, for example, a still camera using a silver halide film as an image recording medium and an electronic camera using a solid state image pickup device, such as a CCD, as an image recording medium, and in particular, it relates to a relay lens system thereof.

2. Description of Related Art

In a known compound camera, an equivalent image plane is defined at the rear of a photographing lens system, in a position which is optically equivalent to an image surface of the photographing lens; a condenser lens is provided in the vicinity of the equivalent image plane; and, a relay lens system is provided behind the condenser lens to re-form an image from the photographing lens system on an image pickup device. Namely, an optical system for an electronic camera is essentially comprised of an optical system including a photographing lens system and a relay lens system in combination. In an optical system for conventional electronic cameras, aberrations of the photographing lens system and aberrations of the relay lens system are separately corrected without substantially taking into account the possible influence of aberrations of the condenser lens.

To meet the demand for a miniaturization of compound cameras, not only the size of the image surface of the still camera but also the Size of the image surface of the electronic camera, using the photographing lens system and the relay lens system in combination, tend to be reduced. To reduce the size of the image surface, it is necessary to increase the resolution of the image pickup device. On the other hand, if the distance between the exit pupil of the photographing lens system and the entrance pupil of the relay lens system is decreased to miniaturize the compound camera, the influence of aberrations of the condenser lens is not negligible.

SUMMARY OF THE INVENTION

It is an object of the present invention to provide an optical system and particularly a relay lens system, for an electronic camera having a photographing lens system (image pickup lens system) and a relay lens system in combination, wherein a high resolution can be obtained even if a small image pickup device is used.

To achieve the object mentioned above, according to the present invention, there is provided an optical system for a compound camera comprising an equivalent image plane, provided at the rear of a photographing lens system in a position which is optically equivalent to an image plane of the photographing lens system; a condenser lens, which is provided in the vicinity of the equivalent image plane; and a relay lens system, which is provided behind the condenser lens to form an image of the photographing lens system on an image pickup device, wherein the relay lens system satisfies the following formulae (1) and (2):

(1) $-0.1 < P < 0.09$ (2) $S3 < 0$ where P stands for the Petzval sum of the whole relay lens system when the focal length of the relay lens system is assumed to be 1.0; and S3 stands for the astigmatism coefficient of the whole relay lens system when the focal length thereof is assumed to be 1.0.

Preferably, the astigmatism coefficient S3 further satisfies the following formula (3):

(3) $-0.2 \leq S3 < 0$

According to an aspect of the present invention, the relay lens system is comprised of a plurality of positive lenses and at least one negative lens and meets the requirements defined by the following formulae (4) and (5):

(4) $1.76 < N_{mean}$ (5) $1.85 < N_{max}$ where $N_{mean}$ stands for the mean refractive index of the d-line of the positive lenses belonging to the relay lens system; and, $N_{max}$ stands for the maximum refractive index of the d-line of the positive lenses belonging to the relay lens system.

The relay lens system can be comprised of five lenses consisting of two positive lenses, one negative lens, and a cemented lens comprising a negative and a positive lens, in this order from the condenser lens side.

Preferably, the optical system for a compound camera of the present invention satisfies the following formula (6):

(6) $1/10 < |m| < 1/3$ where m stands for the lateral magnification of the relay lens system.

It is possible to provide a beam splitting device behind the photographing lens system for splitting a bundle of light transmitted through the photographing lens system to make the same incident upon the equivalent image plane.

The present disclosure relates to subject matter contained in Japanese Patent Application Nos. 06-198755 (filed on Aug. 23, 1994) and 7-166492 (filed on Jun. 30, 1995) which are expressly incorporated herein by reference in their entirety.

BRIEF DESCRIPTION OF THE DRAWINGS

The present invention will be discussed below in detail with reference to the accompanying drawings, in which.

DESCRIPTION OF THE PREFERRED EMBODIMENT

Figure 17:
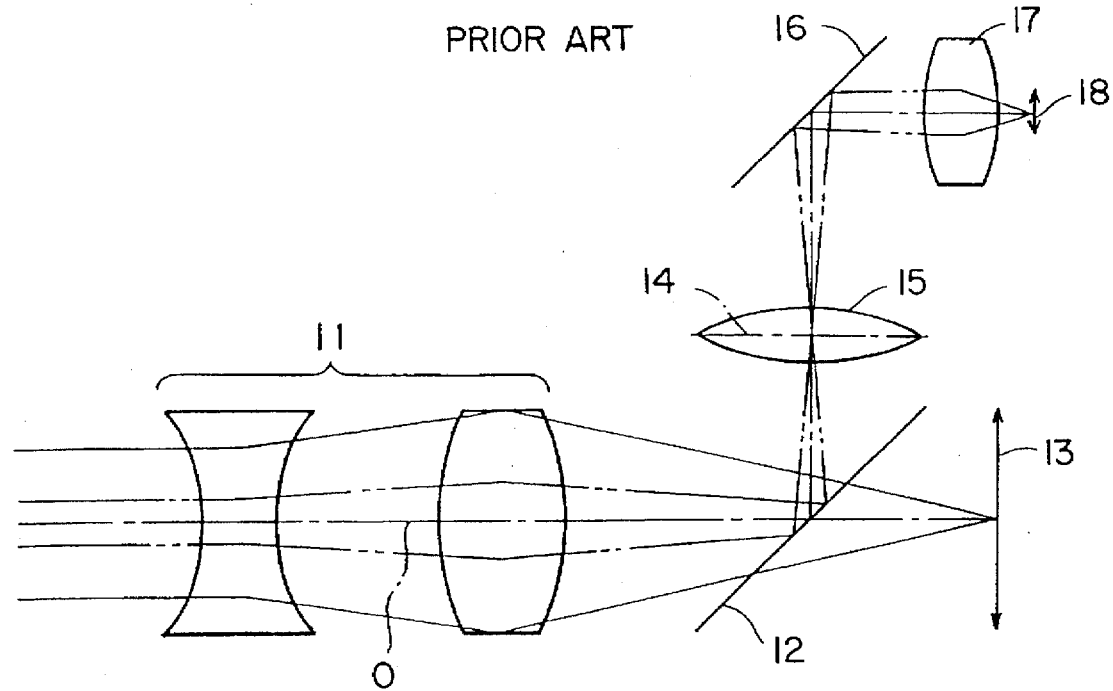

FIG. 17 shows a structure of a compound single lens reflex camera to which the present invention is applied.

A mirror 12 is provided behind a photographing lens system 11 and is inclined at an inclination angle of 45degrees with respect to the optical axis O. The mirror 12 defines an equivalent image plane 14 located at a position which is optically equivalent to an image plane 13 of the photographing lens system 11. A condenser lens 15 is positioned in the vicinity of the equivalent image plane 14. A mirror 16 and a relay lens system 17 are provided behind the condenser lens 15. The relay lens system 17 forms an image of an object which has been formed on the equivalent image plane 14 by the photographing lens system 11, onto an image pickup device 18 of a CCD camera. When the mirror 12 is retracted from the optical path, the image formed by the photographing lens system 11 is recorded on a film located on the image plane 13. The present invention is applied, for example, to the relay lens system 17 of the compound camera as constructed above. The mirror 12 can be a half mirror which is fixed in the optical path.

In the prior art, the relay lens system 17 is usually made of a data reading lens system for a facsimile or scanner, whose aberrations are compensated for. In particular, in the design of such a lens system correction for meridional astigmatism has been considered most important. To this end, in most relay lens systems, the Petzval sum P is not less than 0.1, and the astigmatism coefficient S3 is a negative value, so that the meridional astigmatism curve is substantially flat. However, if such a relay lens system is combined with the condenser lens, the Petzval sum is a large positive value, so that the curvature of the field and particularly the sagittal astigmatism increase in the negative direction. Consequently, the optical performance of the image at the peripheral portion thereof deteriorates. Namely, a high performance over the entire image cannot be obtained. The meridional astigmatism refers to the distance between the Gaussian image plane and the meridional image plane, and the sagittal astigmatism refers to the distance between the Gaussian image plane and the sagittal image plane, respectively.

In the present invention, the curvature of the field of the relay lens system is slightly excessively compensated for in the positive direction, taking into account the fact that the curvature of the field changes in the negative direction if the relay lens system is used in combination with the condenser lens.

If the value P defined in formula (1) exceeds the upper limit, the sagittal astigmatism is a large negative value, in a combination of the relay lens system and the condenser lens, and hence a high optical performance cannot be expected. Conversely, if the value P is below the lower limit in formula (1), the aberration is too excessively corrected, and the number of lenses to be used is increased. Moreover, the lenses must be made from glass having a high refractive index, thus resulting in an increase in the production cost.

Formula (2) defines the astigmatism coefficient. If the relay lens system is combined with the condenser lens, the Petzval sum is positive (i.e., the curvature of the field is negative), as mentioned above. Accordingly, the astigmatism coefficient is preferably a negative value, as defined in formula (2).

Formula (3) further defines the astigmatism coefficient. If the astigmatism coefficient is smaller than the lower limit, the meridional astigmatism becomes a large positive value due to an over-correction of aberrations, contrary to a high optical performance.

The formulae (4) and (5) define the requirements to make the Petzval sum of the relay lens system smaller than the upper limit defined in formula (1). If the mean refractive index of the relay lens system is smaller than the lower limit, the refractive index of the positive lenses are so small that the Petzval sum is too large. Preferably, among the positive lenses, one that has a high positive power is made of glass having a refractive index approximately identical to the lower limit of formula (5) which is larger than the lower limit of formula (4).

The lateral magnification of the relay lens system is preferably small to be within the limits defined in formula (6) to miniaturize the same. If the lateral magnification exceeds the upper limit in formula (6), the size of the image surface of the image pickup device is increased, so that the electronic camera is large, contrary to a miniaturization thereof.

Conversely, if the lateral magnification is below the lower limit, the still picture camera is large and expensive. Namely, the magnification is smaller than the lower limit when the size of the image surface of the photographing lens system is increased, or the size of the image surface of the relay lens system is reduced. The former invites an increase in the size of the still camera. In the latter, it is necessary to further increase the resolution of the image pickup device in order to obtain a high efficiency, thus leading to an increase in the production cost.

The Petzval sum at the n-th surface is defined by the following equation:

$$P_n = -(1/N'_n - 1/N_n) \cdot (1/r_n)$$

wherein $N_n$ stands for the refractive index of the medium located on the image side of the n-th surface;

$N'_n$ stands for the refractive index of the medium located on the object side of the n-th surface; and, $r_n$ stands for the radius of curvature of the n-th surface, respectively.

Assuming that the number of the lenses of the whole relay lens system is k, the Petzval sum P of the whole system is given by:

$$P = \sum_{n=1}^{k} Pn$$

The astigmatism coefficient at the n-th surface is as follows:

$$S3_n = h_n^2 k_n^2 Q'_n{}^2 \Delta n(1/N_2)$$

Since $Q'_n = N_n(1/r_n - 1/t_n)$ and $\Delta_n(1/N_s) = 1/(N'_n \cdot s'_n) - 1/(N_n \cdot s_n)$, the above mentioned equation $S3_n$ is represented by:

$$S3_n = h_n^2 \cdot k_n^2 \cdot N_n^2 \cdot (1/r_n - 1/t_n)^2 \cdot \{1/(N'_n \cdot s'_n) - 1/(N_n \cdot s_n)\}$$

wherein $h_n$ stands for the height of the off-axis light;

$k_n$ stands for the height of axial light;

$t_n$ stands for the distance between the intersecting point of the off-axis incident light with the optical axis and the top of the lens on the optical axis;

$s_n$ stands for the distance between the intersecting point of the axial incident light with the optical axis and the top of the lens on the optical axis;

$s'_n$ stands for the distance between the intersecting point of the refracted axial light with the optical axis and the top of the lens on the optical axis.

Assuming that the number of lenses in the relay lens system is k, the astigmatism coefficient S3 of the whole system is given by:

$$S3 = \sum_{n=1}^{k} S3_n$$

Embodiments of the present invention will be discussed below.

EMBODIMENT 1

FIGS. 1 through 8 show a first embodiment of an optical system for a camera according to the present invention.

Figure 1:
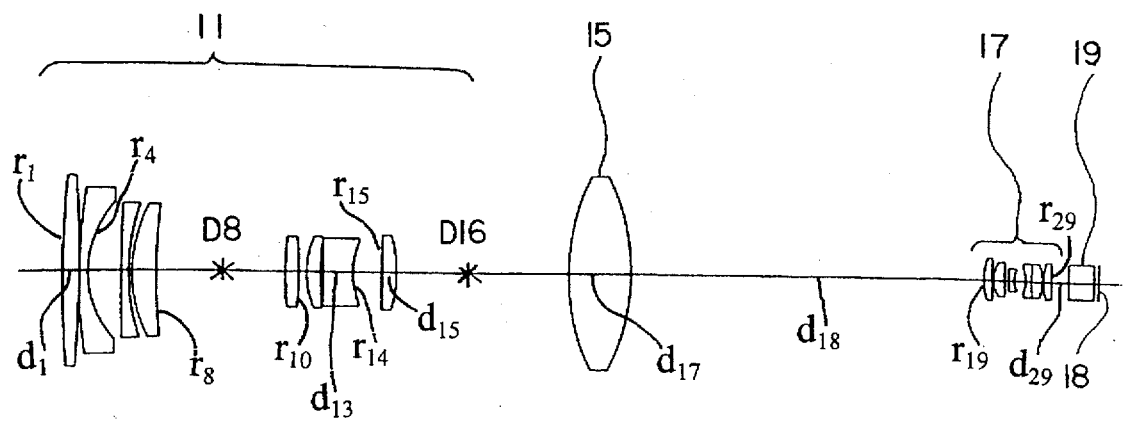
FIG. 1 is a schematic view of an optical system for a compound camera showing a lens arrangement at a wide angle extremity, according to a first embodiment of the present invention.
Figure 2:
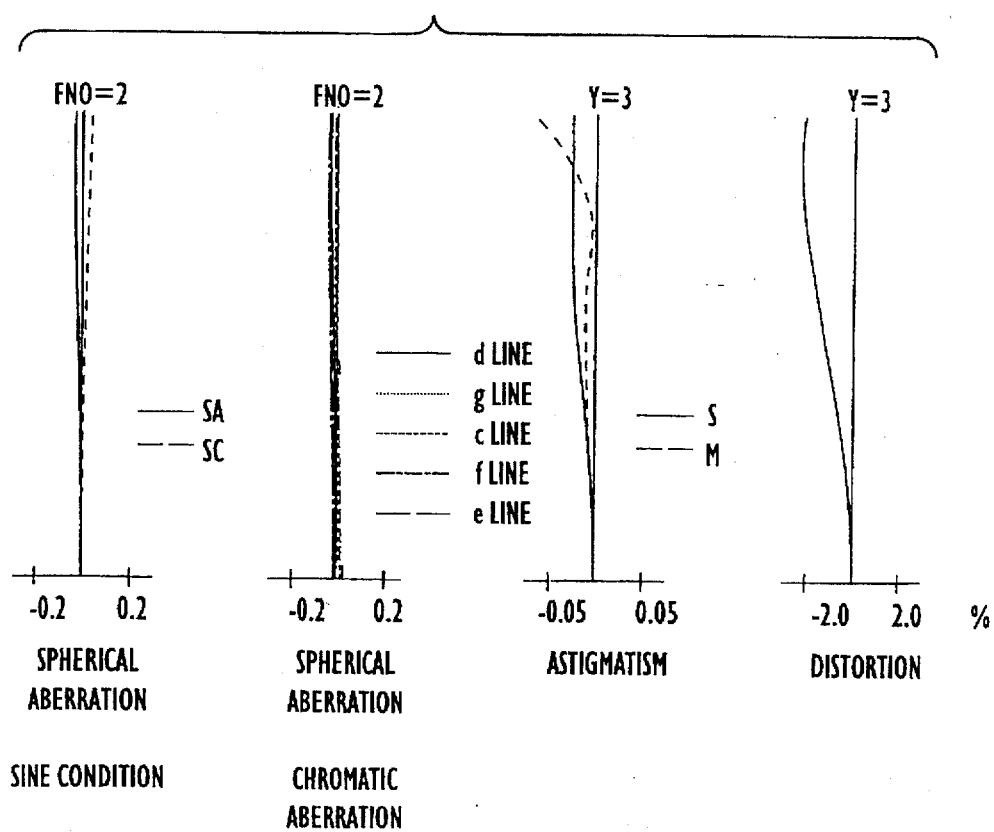
FIG. 2 shows diagrams of various aberrations of the optical lens system in FIG. 1.
Figure 3:
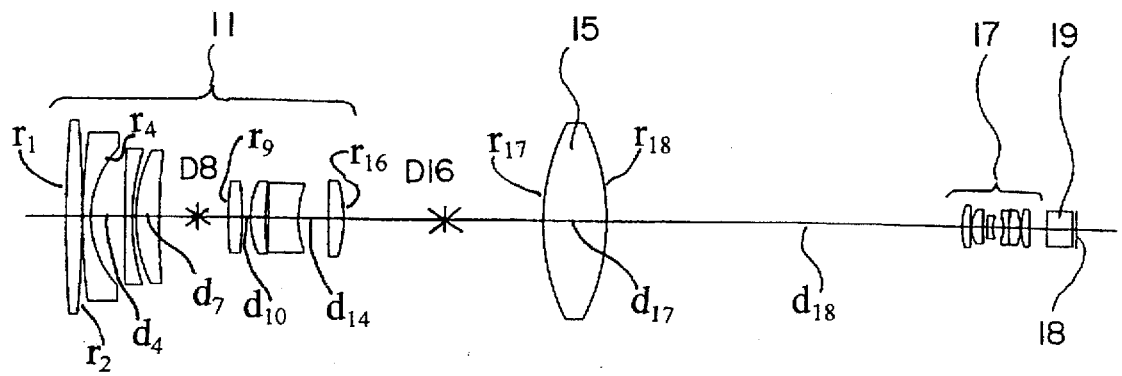
FIG. 3 is a schematic view of an optical system for a compound camera showing a lens arrangement at a telephoto extremity, according to a first embodiment of the present invention.
Figure 4:
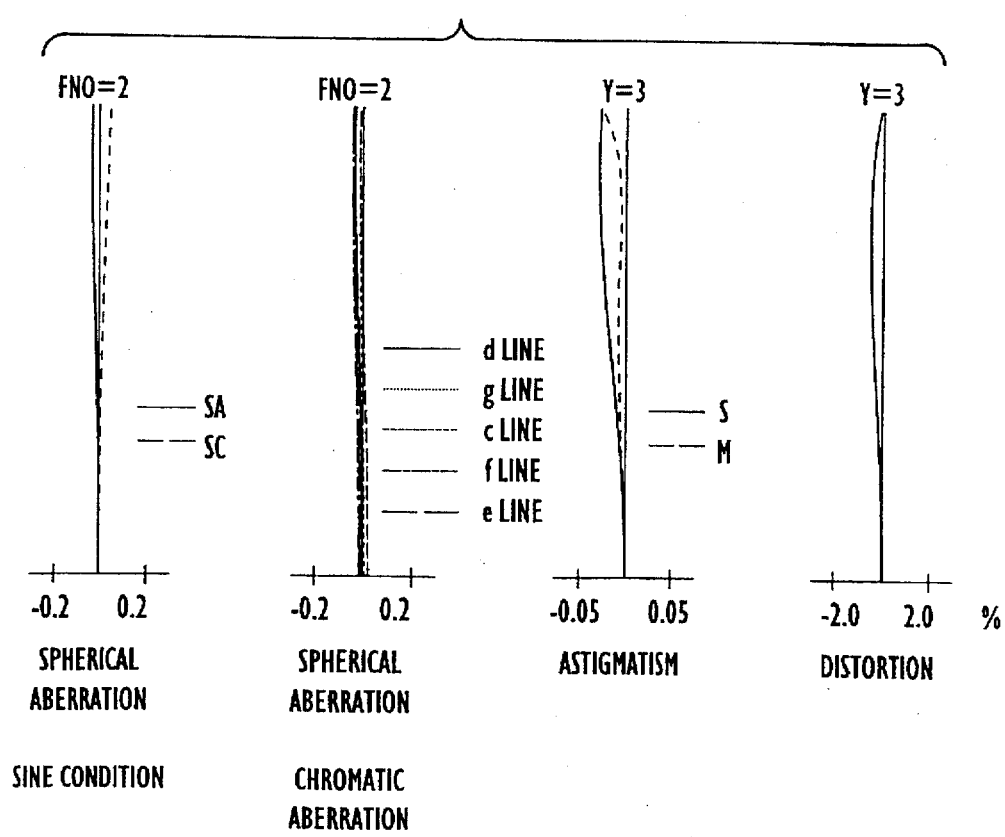
FIG. 4 shows diagrams of various aberrations of the lens system in FIG. 3.
Figure 5:
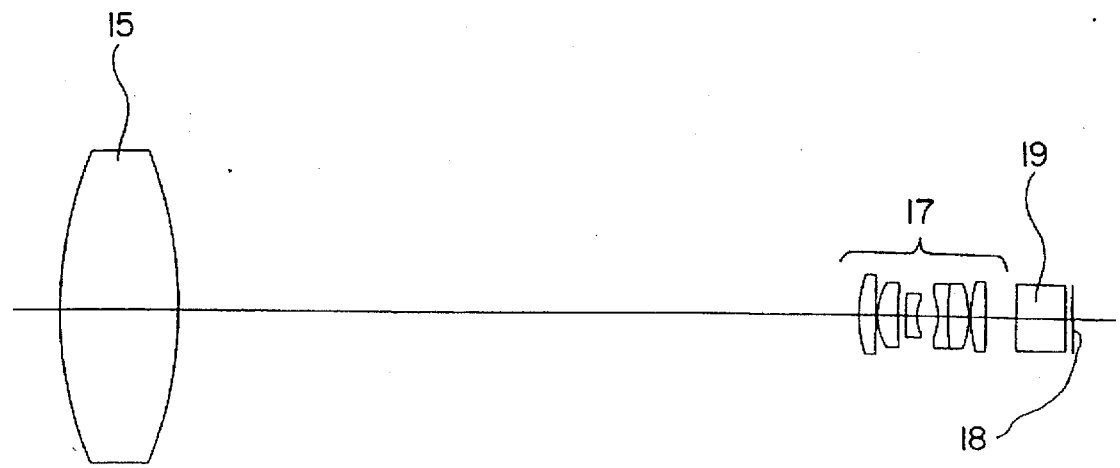
FIG. 5 is a schematic view of an optical system for a compound camera showing a condenser lens and a relay lens system, according to a first embodiment of the present invention.
Figure 6:
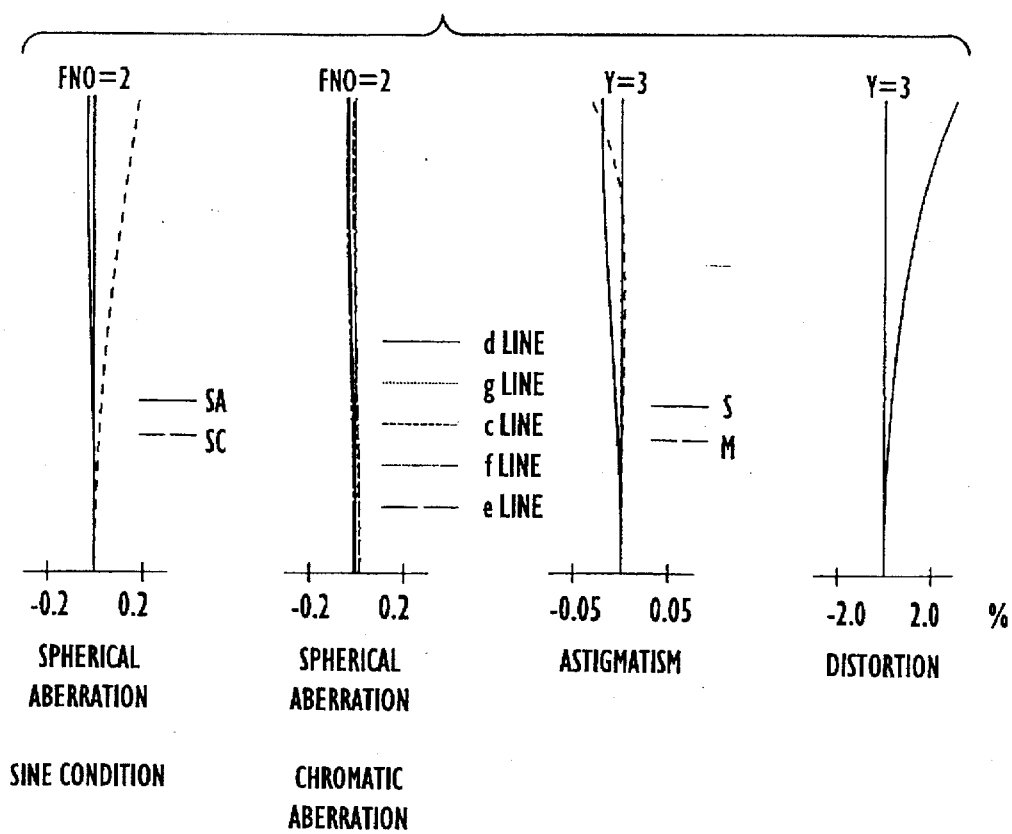
FIG. 6 shows diagrams of various aberrations of the lens system in FIG. 5.
Figure 7:
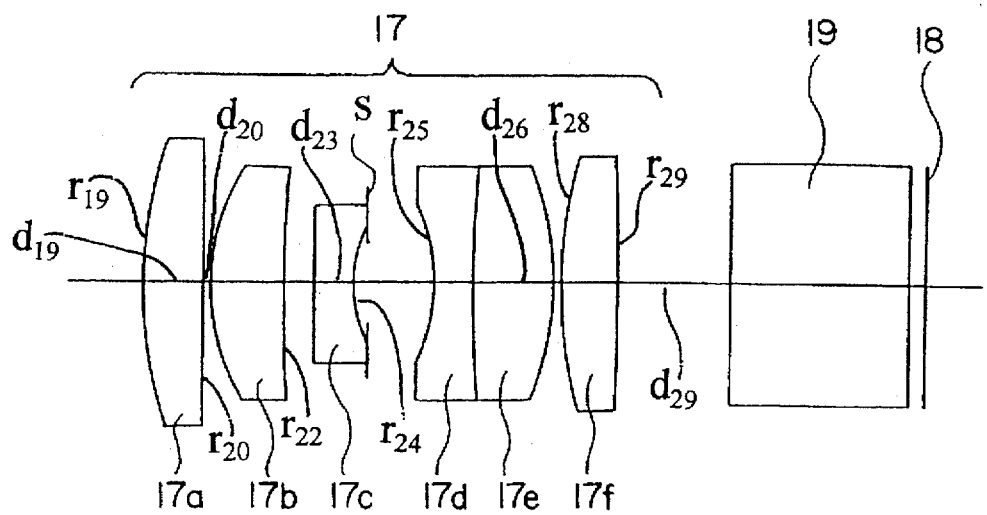
FIG. 7 is a schematic view of an optical system for a compound camera showing a relay lens system, according to a first embodiment of the present invention.
Figure 8:
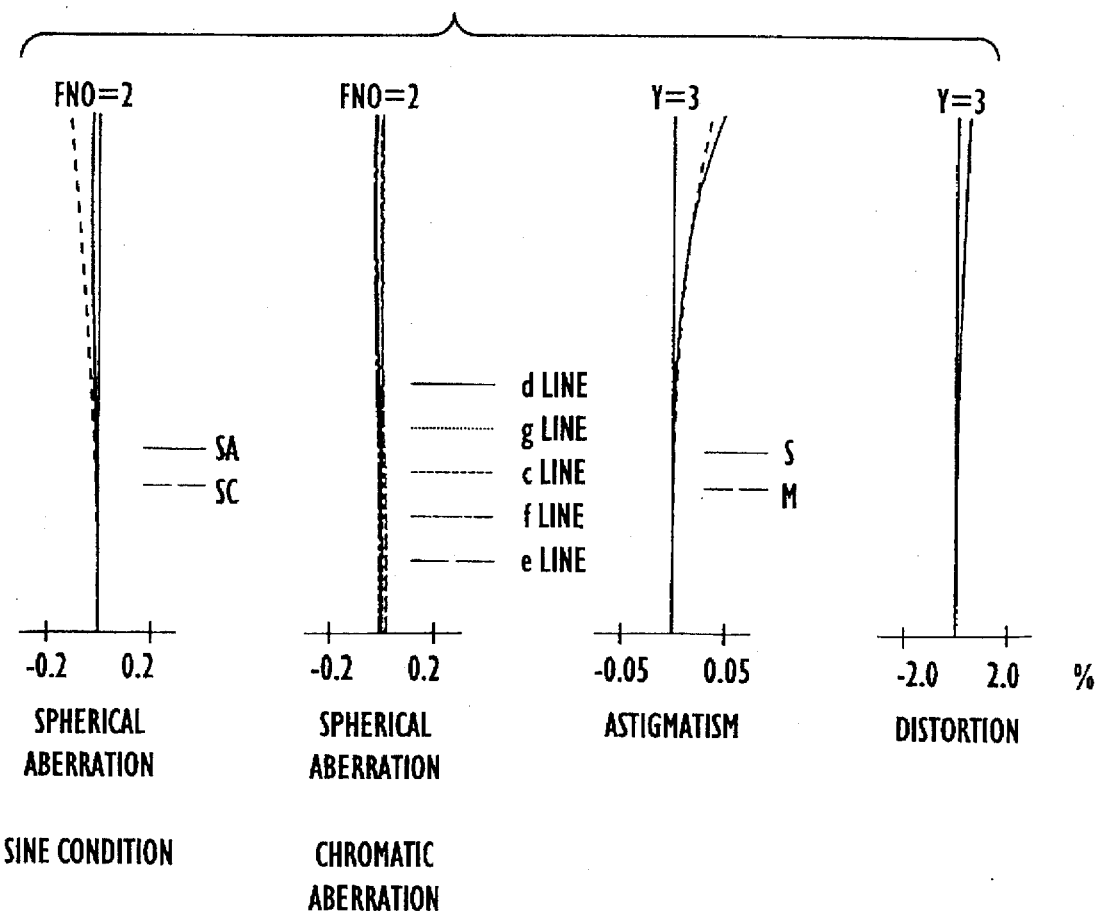
FIG. 8 shows diagrams of various aberrations of the lens system in FIG. 7.

In the first embodiment, the optical system includes a photographing lens system 11, a condenser lens 15, a relay lens system 17, a filter 19, and an image pickup device 18, in this order from the object side. The photographing lens system 11 is a zoom lens system. FIGS. 1 and 3 show the whole lens system at the wide angle extremity and the telephoto extremity, respectively. FIG. 5 shows the condenser lens 15 and the relay lens system 17; and, FIG. 7 shows the relay lens system 17. In the illustrated embodiment, the relay lens system 17 is comprised of two positive lenses 17a and 17b, one negative lens 17c, a cemented lens comprising a negative lens 17d and a positive lens 17e, and another positive lens 17f. There is a diaphragm S behind the negative lens 17c. FIGS. 2, 4, 6 and 8 show diagrams of aberrations in the lens arrangements shown in FIGS. 1, 3, 5 and 7, respectively.

Numerical data for the lens system is shown in Table 1 below. In the drawings and table, "SA" designates the spherical aberration; "SC" the sine condition; "d-line", "g-line", "c-line", "F-line", and "e-line" the chromatic aberrations represented by spherical aberrations at the respective wavelengths; and "S" and "M" the sagittal ray and meridional ray, respectively.

Also, in the drawings and table, "$F_{NO}$" designates the f-number; "f" the focal length; "m" the lateral magnification; "Y" the image height; "R" the radius of curvature, "D" the distance between the lenses, "$N_d$" the refractive index of the d-line; "$\nu_d$" the Abbe number, respectively. The surfaces and distances are numbered consecutively from the image side.

TABLE 1 photographing lens system 11 surface NO.1~NO.16)
$F_{NO} = 3.5$
f = 23~29
D8 = 23.89~12.50
D16 = 32.09~36.27
condenser lens 15 (surface No.17~No.18)
f = 40.25
relay lens system 17 surface No.19~No.29)
$F_{NO} = 2$
f = 13.29
m = 1/5
Y = 3.0
filter 19 (surface No.30~No.31)

| surface No. | R | D | $N_d$ | $\nu d$ |
|---|---|---|---|---|
| 1 | 206.849 | 3.07 | 1.51633 | 64.1 |
| 2 | −206.849 | 0.10 | — | — |
| 3 | 112.397 | 1.50 | 1.80610 | 40.9 |
| 4 | 17.827 | 6.44 | — | — |
| 5 | 435.054 | 1.40 | 1.69680 | 55.5 |
| 6 | 36.456 | 0.70 | — | — |
| 7 | 25.758 | 4.50 | 1.80518 | 25.4 |
| 8 | 116.421 | D8 | — | — |
| 9 | 58.125 | 2.57 | 1.70154 | 41.2 |
| 10 | −58.125 | 1.46 | — | — |
| 11 | 15.350 | 2.79 | 1.69680 | 55.5 |
| 12 | 58.481 | 0.55 | — | — |
| 13 | −123.305 | 5.50 | 1.80518 | 25.4 |
| 14 | 14.523 | 5.54 | — | — |
| 15 | 256.227 | 2.80 | 1.71299 | 53.9 |
| 16 | −23.537 | D16 | — | — |
| 17 | 39.500 | 11.50 | 1.51633 | 64.1 |
| 18 | −39.500 | 66.00 | — | — |
| 19 | 11.306 | 1.65 | 1.69680 | 55.5 |
| 20 | 1800.000 | 0.20 | — | — |
| 21 | 5.637 | 2.03 | 1.69680 | 55.5 |
| 22 | 31.120 | 0.80 | — | — |
| 23 | 134.792 | 1.05 | 1.80518 | 25.4 |
| 24 | 3.600 | 2.13 | — | — |
| 25 | −5.000 | 1.00 | 1.59270 | 35.3 |
| 26 | 36.169 | 2.09 | 1.88300 | 40.8 |
| 27 | −8.327 | 0.20 | | |
| 28 | 12.107 | 1.53 | 1.80400 | 46.6 |
| 29 | −102.957 | 3.20 | — | — |
| 30 | ∞ | 4.91 | 1.51633 | 64.1 |
| 31 | ∞ | — | — | — |

EMBODIMENT 2

FIGS. 9 through 16 show a second embodiment of an optical system for a camera according to the present invention.

Figure 9:
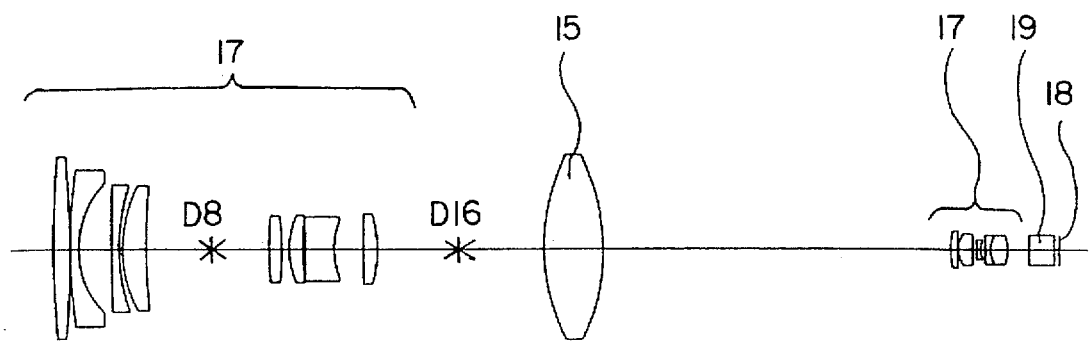
FIG. 9 is a schematic view of an optical system for a compound camera showing a lens arrangement at a wide angle extremity, according to a second embodiment of the present invention.
Figure 10:
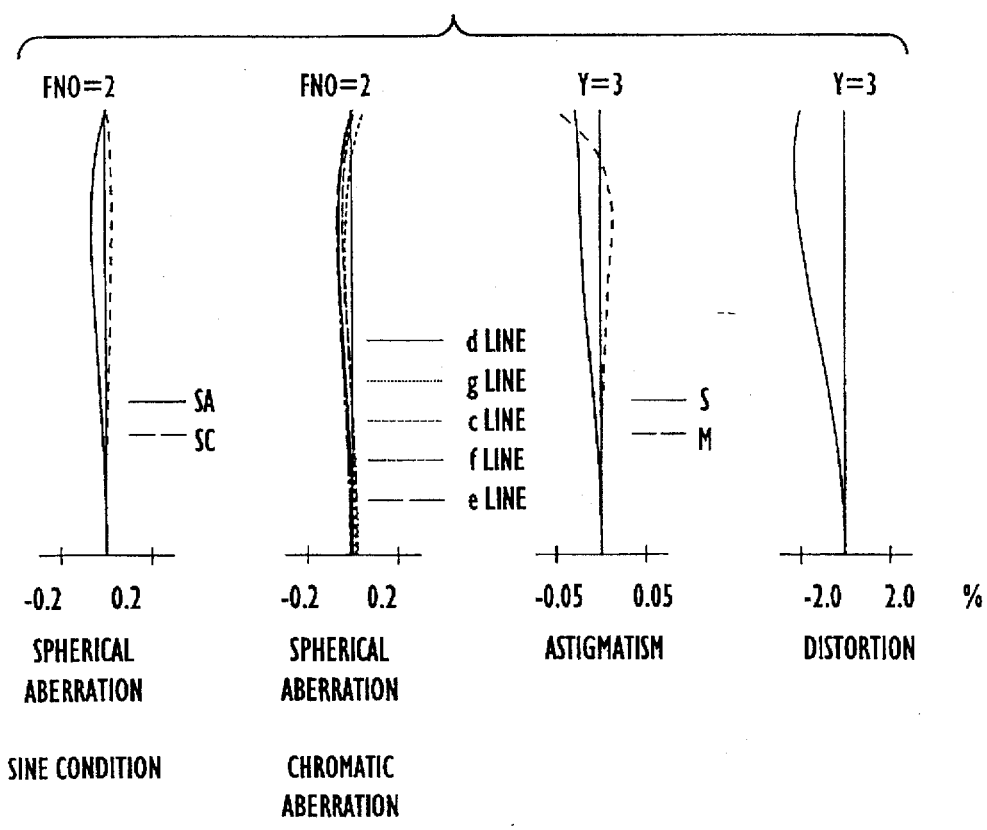
FIG. 10 shows diagrams of various aberrations of the optical lens system in FIG. 9.
Figure 11:
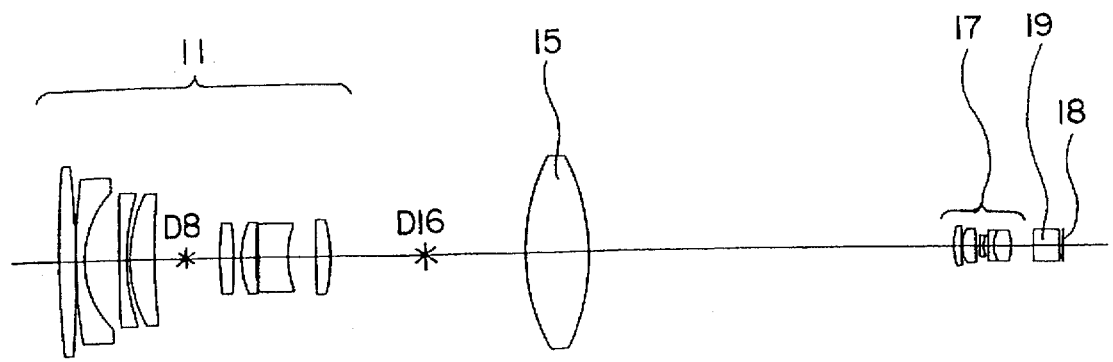
FIG. 11 is a schematic view of an optical system for a compound camera showing a lens arrangement at a telephoto extremity, according to a second embodiment of the present invention.
Figure 12:
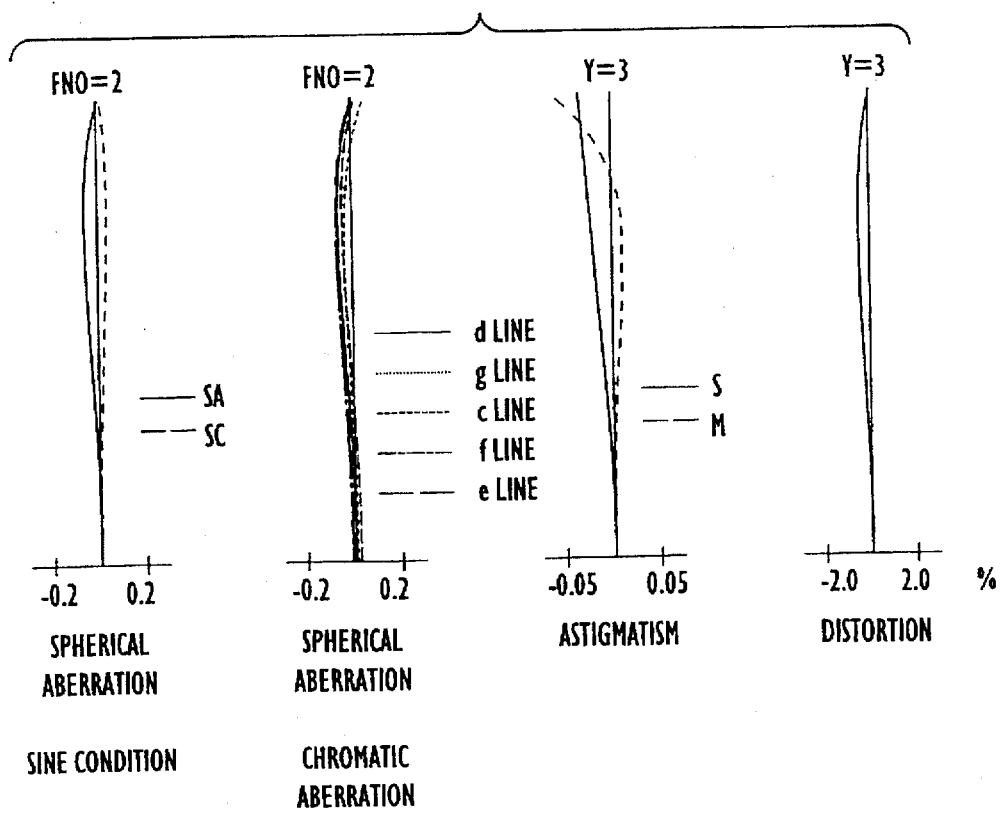
FIG. 12 shows diagrams of various aberrations of the lens system in FIG. 11.
Figure 13:
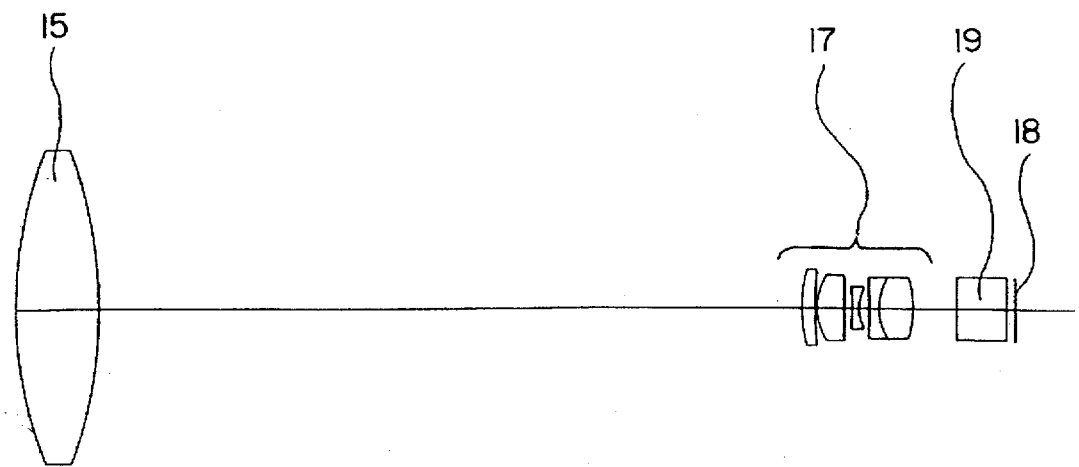
FIG. 13 is a schematic view of an optical system for a compound camera showing a condenser lens and a relay lens system, according to a second embodiment of the present invention.
Figure 14:
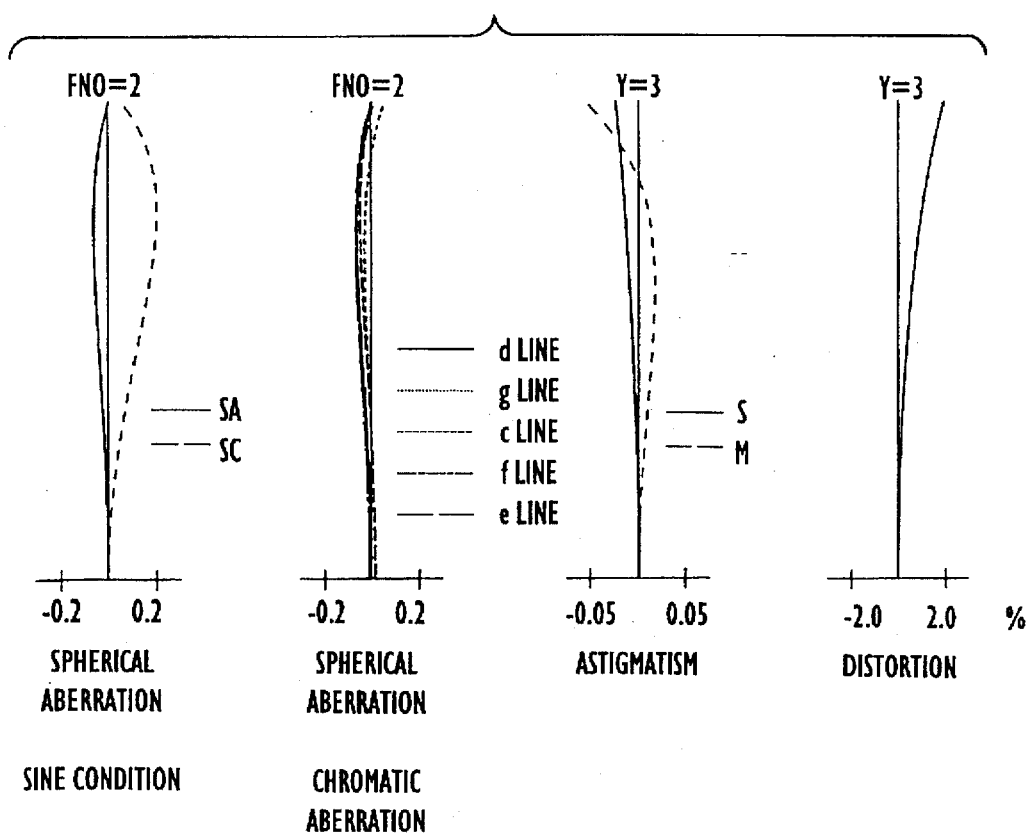
FIG. 14 shows diagrams of various aberrations of the lens system in FIG. 13.
Figure 15:
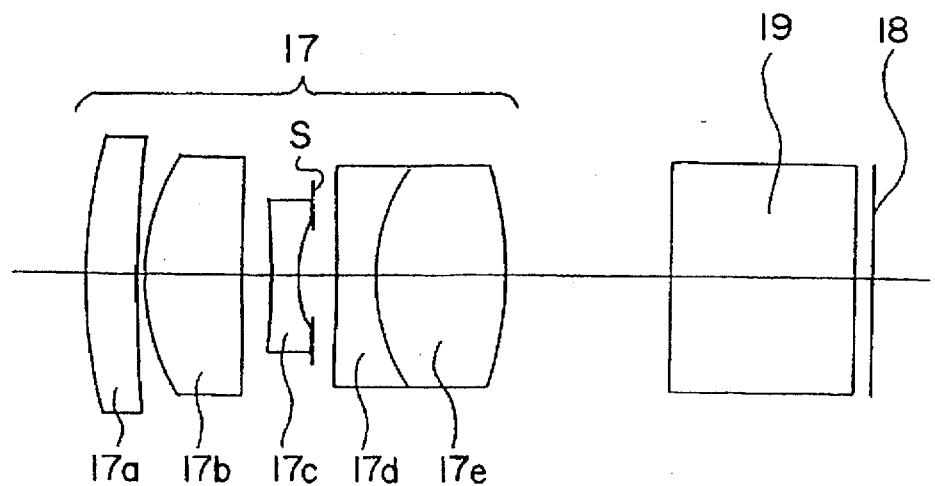
FIG. 15 is a schematic view of an optical system for a compound camera showing a relay lens system, according to a second embodiment of the present invention.
Figure 16:
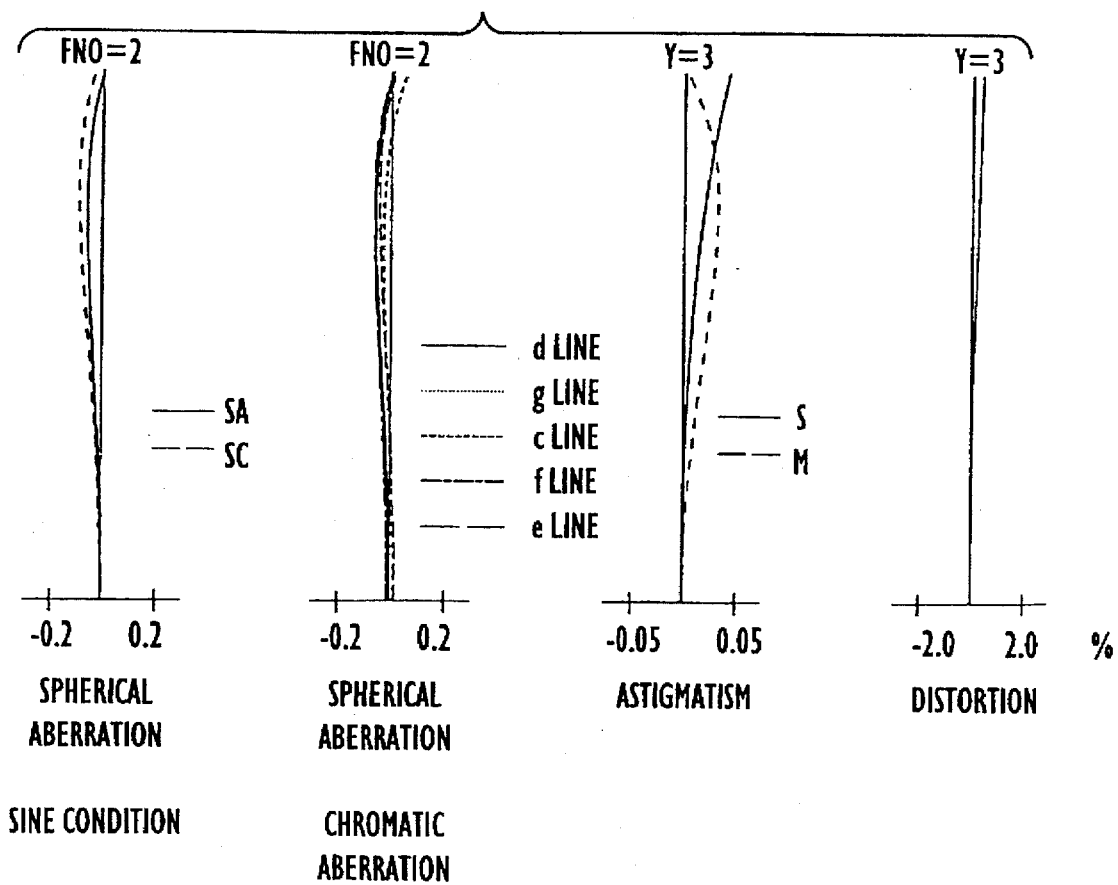
FIG. 16 shows diagrams of various aberrations of the lens system in FIG. 15; and, FIG. 17 shows a lens arrangement of a compound camera to which the present invention is applied, by way of example.

FIGS. 9 and 11 show the whole lens system at the wide angle extremity and the telephoto extremity, respectively. FIG. 13 shows the condenser lens 15 and the relay lens system 17; and, FIG. 15 shows the relay lens system 17. In the second embodiment, the relay lens system 17 is comprised of two positive lenses 17a and 17b, one negative lens 17c, and a cemented lens comprising a negative lens 17d and a positive lens 17e. Namely, in the second embodiment, there is no terminal positive lens 17f as provided in the first embodiment. The diaphragm S is located behind the negative lens 17c. FIGS. 10, 12, 14 and 16 show diagrams of aberrations in the lens arrangements shown in FIGS. 9, 11, 13 and 15, respectively.

TABLE 2 photographing lens system 11 (surface No.1–No.16)
$F_{NO} = 3.5$
$f = 23-29$
$Y = 15.0$
$D8 = 23.89-12.50$
$D16 = 32.09-36.27$
condenser lens 15 (surface No.17–No.18)
$f = 40.25$
relay lens system 17 (surface No.19–No.27)
$F_{NO} = 2$
$f = 12.62$
$m = 1/5$
$Y = 3.0$
filter 19 (surface No.28–No.29)

| surface No. | R | D | $N_d$ | $v_d$ |
|---|---|---|---|---|
| 1 | 206.849 | 3.07 | 1.51633 | 64.1 |
| 2 | −206.849 | 0.10 | — | — |
| 3 | 112.397 | 1.50 | 1.80610 | 40.9 |
| 4 | 17.827 | 6.44 | — | — |
| 5 | 435.054 | 1.40 | 1.69680 | 55.5 |
| 6 | 36.456 | 0.70 | — | — |
| 7 | 25.758 | 4.50 | 1.80518 | 25.4 |
| 8 | 116.421 | D8 | — | — |
| 9 | 58.125 | 2.57 | 1.70154 | 41.2 |
| 10 | −58.125 | 1.46 | — | — |
| 11 | 15.350 | 2.79 | 1.69680 | 55.5 |
| 12 | 58.481 | 0.55 | — | — |
| 13 | −123.305 | 5.50 | 1.80518 | 25.4 |
| 14 | 14.523 | 5.54 | — | — |
| 15 | 256.227 | 2.80 | 1.71299 | 53.9 |
| 16 | −23.537 | D16 | — | — |
| 17 | 39.500 | 11.50 | 1.51633 | 64.1 |
| 18 | −39.500 | 68.00 | — | — |
| 19 | 12.947 | 1.35 | 1.69680 | 55.5 |
| 20 | 34.520 | 0.20 | — | — |
| 21 | 5.806 | 2.63 | 1.80400 | 46.6 |
| 22 | 86.026 | 0.80 | — | — |
| 23 | −22.270 | 0.70 | 1.80518 | 25.4 |
| 24 | 3.537 | 1.01 | — | — |
| 25 | −36.775 | 1.00 | 1.59270 | 35.3 |
| 26 | 5.044 | 3.38 | 1.88300 | 40.8 |
| 27 | −9.531 | 4.38 | — | — |
| 28 | ∞ | 4.91 | 1.51633 | 64.1 |
| 29 | ∞ | — | — | — |

Table 3 below shows numerical values of the formulae (1) defining through (6) in the above-mentioned embodiments 1 and 2.

TABLE 3

| | Embodiment 1 | Embodiment 2 |
|---|---|---|
| formula(1) (P) | 0.011 | 0.045 |
| formula(2) defining (S3) | −0.056* | −0.145* |
| formula(2) defining (S3) | −0.056* | −0.145* |
| formula(4) defining ($N_{MEAN}$) | 1.770 | 1.795 |
| formula(5) defining ($N_{MAX}$) | 1.883 | 1.883 |
| formula(6) defining (m) | 1/5 | 1/5 |

As can be seen in Table 3, the values in the first second embodiments meet the requirements defined in the formulae (1) through (6). In the optical system for a camera according to the present invention, since the astigmatism of the relay lens system is excessively compensated in the positive direction, the resultant astigmatism of the optical system of the relay lens system and the condenser lens can be satisfactorily compensated.

As may be understood from the above discussion, according to the present invention, since the Petzval sum of the relay lens system is selected to be small, as defined in formula (1), and an over-correction of the astigmatism in the positive direction is produced as defined in formula (2), the resultant astigmatism of a compound optical system including the relay lens system and the condenser lens in combination can be well corrected. Consequently, if a small image pickup device for an electronic camera in which the image pickup lens system and the relay system are employed in combination, a high resolution can be obtained.

We claim:

1. An optical system for a camera, comprising:

a photographing lens system for forming an image of an object at an image plane;

an equivalent image plane provided at a rear of said photographing lens system, in a position which is optically equivalent to said image plane;

a condenser lens provided proximate to said equivalent image plane; and, a relay lens system provided behind said condenser lens along an optical path of said photographic lens system to form an image of the object formed at said equivalent image plane on an image pickup devices, wherein said relay lens system comprises a plurality of positive lenses and at least one negative lens and satisfies the following relationships:

$-0.1 < P < 0.09$ $S3 < 0$ $1.76 < N_{mean}$ $1.85 < N_{max}$ wherein,

P represents the Petzval sum of said relay lens system when a focal length of said relay lens system is assumed to be 1.0;

S3 represents the astigmatism coefficient of said relay lens system when the focal length of said relay lens system is assumed to be 1.0;

$N_{mean}$ represents a mean refractive index of the d-line of the positive lenses of said relay lens system; and $N_{max}$ represents a maximum refractive index of the d-line of the positive lenses of said relay lens system.

2. An optical system for a camera according to claim 1, wherein said relay lens system satisfies the following relationship:

$-0.2 < S3 < 0.$

3. An optical system for a camera according to claim 1, wherein said relay lens system satisfies the following relationship:

$1/10 < |m| < 1/3$ wherein, m stands for a lateral magnification of said relay lens system.

4. An optical system for a camera according to claim 1, further comprising beam splitting means which is located behind said photographing lens system, for splitting a bundle of light transmitted through said photographing lens system, said split light being incident upon the equivalent image plane.

5. An optical system for a camera, comprising:

a photographing lens system for forming an image of an object at an image plane;

an equivalent image plane provided at a rear of said photographing lens system, in a position which is optically equivalent to said image plane;

a condenser lens provided proximate to said equivalent image plane; and a relay lens system provided behind said condenser lens along an optical path of said photographic lens system to form an image of the object formed at said equivalent image plane on an image pickup device, said relay lens system comprising five lenses consisting of two positive lenses, one negative lens, and a cemented lens comprising a negative lens and a positive lens, in this order from said condenser lens side, and said relay lens system satisfies the following relationships:

$$-0.1 < P < 0.09$$

$$S3 < 0$$

wherein,

P represents the Petzval sum of said relay lens system when a focal length of said relay lens system is assumed to be 1.0; and S3 represents the astigmatism coefficient of said relay lens system when the focal length of said relay lens system is assumed to be 1.0.

6. An optical system for a camera according to claim 5, wherein said relay lens system satisfies the following relationship:

$$-0.2 < S3 < 0.$$

7. An optical system for a camera according to claim 6, wherein said relay lens system comprises a plurality of positive lenses and at least one negative lens and meets the requirements defined by the relationships:

$$1.76 < N_{mean}$$

$$1.85 < N_{max}$$

wherein, $N_{mean}$ represents a mean refractive index of the d-line of the positive lenses of said relay lens system; and, $N_{max}$ represents a maximum refractive index of the d-line of the positive lenses of said relay lens system.

8. An optical system for a camera according to claim 7, wherein said relay lens system is comprised of five lenses consisting of two positive lenses, one negative lens, and a cemented lens comprising a negative lens and a positive lens, in this order from said condenser lens side.

9. An optical system for a camera according to claim 5, wherein said relay lens system satisfies the following relationship:

$$1/10 < |m| < 1/3$$

wherein, m stands for a lateral magnification of said relay lens system.

10. An optical system for a camera according to claim 5, further comprising a beam splitting means, located behind said photographing lens system, for splitting a bundle of light transmitted through said photographing lens system, said split light being incident upon said equivalent image plane.

* * * * *